US007865512B2

(12) United States Patent
Evans

(10) Patent No.: US 7,865,512 B2
(45) Date of Patent: Jan. 4, 2011

(54) SYSTEMS AND METHODS FOR PROVIDING VICTIM LOCATION INFORMATION DURING AN EMERGENCY SITUATION

(75) Inventor: Raymond K. Evans, Sandy, UT (US)

(73) Assignee: Panasonic Electric Works Co., Ltd., Osaka (JP)

( * ) Notice: Subject to any disclaimer, the term of this patent is extended or adjusted under 35 U.S.C. 154(b) by 343 days.

(21) Appl. No.: 11/320,555

(22) Filed: Dec. 27, 2005

(65) Prior Publication Data

US 2007/0150460 A1 Jun. 28, 2007

(51) Int. Cl.
*G06F 17/30* (2006.01)

(52) U.S. Cl. ...................................................... 707/758

(58) Field of Classification Search ....................... None
See application file for complete search history.

(56) References Cited

U.S. PATENT DOCUMENTS 4,527,504 A 7/1985 Byerley
5,552,772 A 9/1996 Janky et al.
6,484,021 B1 11/2002 Hereford et al.
6,819,236 B2 * 11/2004 Kawai et al. ........... 340/539.24
6,970,751 B2 * 11/2005 Gonzales et al. .............. 700/87
2002/0152298 A1 * 10/2002 Kikta et al. ................. 709/223
2003/0234725 A1 * 12/2003 Lemelson et al. ........... 340/521
2004/0070515 A1 * 4/2004 Burkley et al. ......... 340/825.49
2004/0257208 A1 * 12/2004 Huang et al. ............. 340/426.1
2005/0146429 A1 7/2005 Spoltore et al.

FOREIGN PATENT DOCUMENTS

WO 01/26327 4/2001
WO 02/23381 3/2002

* cited by examiner

*Primary Examiner*—Don Wong
*Assistant Examiner*—Belinda Xue
(74) *Attorney, Agent, or Firm*—Austin Rapp & Hardman

(57) ABSTRACT

A monitoring system receives data from embedded systems that are located within a building. The embedded systems may be contained within components (e.g., sensors, switches, etc.) that are situated within the building. Rules are defined for interpreting the data. The monitoring system interprets the data based on the defined rules to obtain location information and/or event information. The location information includes possible locations of victims within the building. The event information includes events that have been detected by components within the building. The location information and the event information may be provided to one or more emergency response systems.

16 Claims, 10 Drawing Sheets

SYSTEMS AND METHODS FOR PROVIDING VICTIM LOCATION INFORMATION DURING AN EMERGENCY SITUATION

TECHNICAL FIELD

The present invention relates generally to computers and computer-related technology. More specifically, the present invention relates to systems and methods for providing victim location information during an emergency situation.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

Computers typically have one or more processors at the heart of the computer. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded devices or embedded systems. (The terms "embedded device" and "embedded system" will be used interchangeably herein.) An embedded system usually refers to computer hardware and software that is part of a larger system. Embedded systems may not have typical input and output devices such as a keyboard, mouse, and/or monitor. Usually, at the heart of each embedded system is one or more processor(s).

A lighting system may incorporate an embedded system. The embedded system may be used to monitor and control the effects of the lighting system. For example, the embedded system may provide controls to dim the brightness of the lights within the lighting system. Alternatively, the embedded system may provide controls to increase the brightness of the lights. The embedded system may provide controls to initiate a specific lighting pattern among the individual lights within the lighting system. Embedded systems may be coupled to individual switches within the lighting system. These embedded systems may instruct the switches to power up or power down individual lights or the entire lighting system. Similarly, embedded systems may be coupled to individual lights within the lighting system. The brightness or power state of each individual light may be controlled by the embedded system.

A security system may also incorporate an embedded system. The embedded system may be used to control the individual security sensors that comprise the security system. For example, the embedded system may provide controls to power up each of the security sensors automatically. Embedded systems may be coupled to each of the individual security sensors. For example, an embedded system may be coupled to a motion sensor. The embedded system may power up the individual motion sensor automatically and provide controls to activate the motion sensor if motion is detected. Activating a motion sensor may include providing instructions to power up an LED located within the motion sensor, output an alarm from the output ports of the motion sensor, and the like. Embedded systems may also be coupled to sensors monitoring a door. The embedded system may provide instructions to the sensor monitoring the door to activate when the door is opened or closed. Similarly, embedded systems may be coupled to sensors monitoring a window. The embedded system may provide instructions to activate the sensor monitoring the window if the window is opened or closed.

Some embedded systems may also be used to control wireless products such as cell phones. The embedded system may provide instructions to power up the LED display of the cell phone. The embedded system may also activate the audio speakers within the cell phone to provide the user with an audio notification relating to the cell phone.

Home appliances may also incorporate an embedded system. Home appliances may include appliances typically used in a conventional kitchen, e.g., stove, refrigerator, microwave, etc. Home appliances may also include appliances that relate to the health and well-being of the user. For example, a massage recliner may incorporate an embedded system. The embedded system may provide instructions to automatically recline the back portion of the chair according to the preferences of the user. The embedded system may also provide instructions to initiate the oscillating components within the chair that cause vibrations within the recliner according to the preferences of the user.

Additional products typically found in homes may also incorporate embedded systems. For example, an embedded system may be used within a toilet to control the level of water used to refill the container tank. Embedded systems may be used within a jetted bathtub to control the outflow of air.

As stated, embedded systems may be used to monitor or control many different systems, resources, products, etc. With the growth of the Internet and the World Wide Web, embedded systems are increasingly connected to the Internet so that they can be remotely monitored and/or controlled. Other embedded systems may be connected to computer networks including local area networks, wide area networks, etc. As used herein, the term "computer network" (or simply "network") refers to any system in which a series of nodes are interconnected by a communications path. The term "node" refers to any device that may be connected as part of a computer network. An embedded system may be a network node. Other examples of network nodes include computers, personal digital assistants (PDAs), cell phones, etc.

Some embedded systems may provide data and/or services to other computing devices using a computer network. Many different kinds of services may be provided. Some examples of services include providing temperature data from a location, providing surveillance data, providing weather information, providing an audio stream, providing a video stream, etc.

Although embedded systems are used in many different contexts, there are still many situations in which the functionality that may be provided by embedded systems has not been fully utilized. One such area is search and rescue during an emergency situation. Many emergency situations may occur in which rescue workers may be called upon to attempt to locate victims within a building (e.g., a home, apartment complex, office building, store, etc.). Some examples of such emergency situations include earthquakes, fires, hurricanes, tornadoes, tsunamis, terrorist strikes, etc. Time is generally quite precious during a search and rescue operation, and as a result it would be beneficial if means were provided to rescue workers to quickly and easily locate victims within a building.

Unfortunately, there are a variety of problems with known attempts to provide victim location information to rescue workers in an emergency situation. For example, one approach is to provide stickers to occupants of a home to place on the windows of bedrooms so that rescue workers know where to look when an emergency situation occurs. However, this approach may only be effective if the occupants of the home are in their bedroom(s) when an emergency situation occurs and a rescue effort takes place. Of course, there are a variety of reasons why this may not be the case. Other attempts to provide victim location information to rescue workers in an emergency situation suffer from similar drawbacks. Accordingly, benefits may be realized by improvements related to mechanisms for providing information to rescue workers about the location of victims within a building during an emergency situation.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
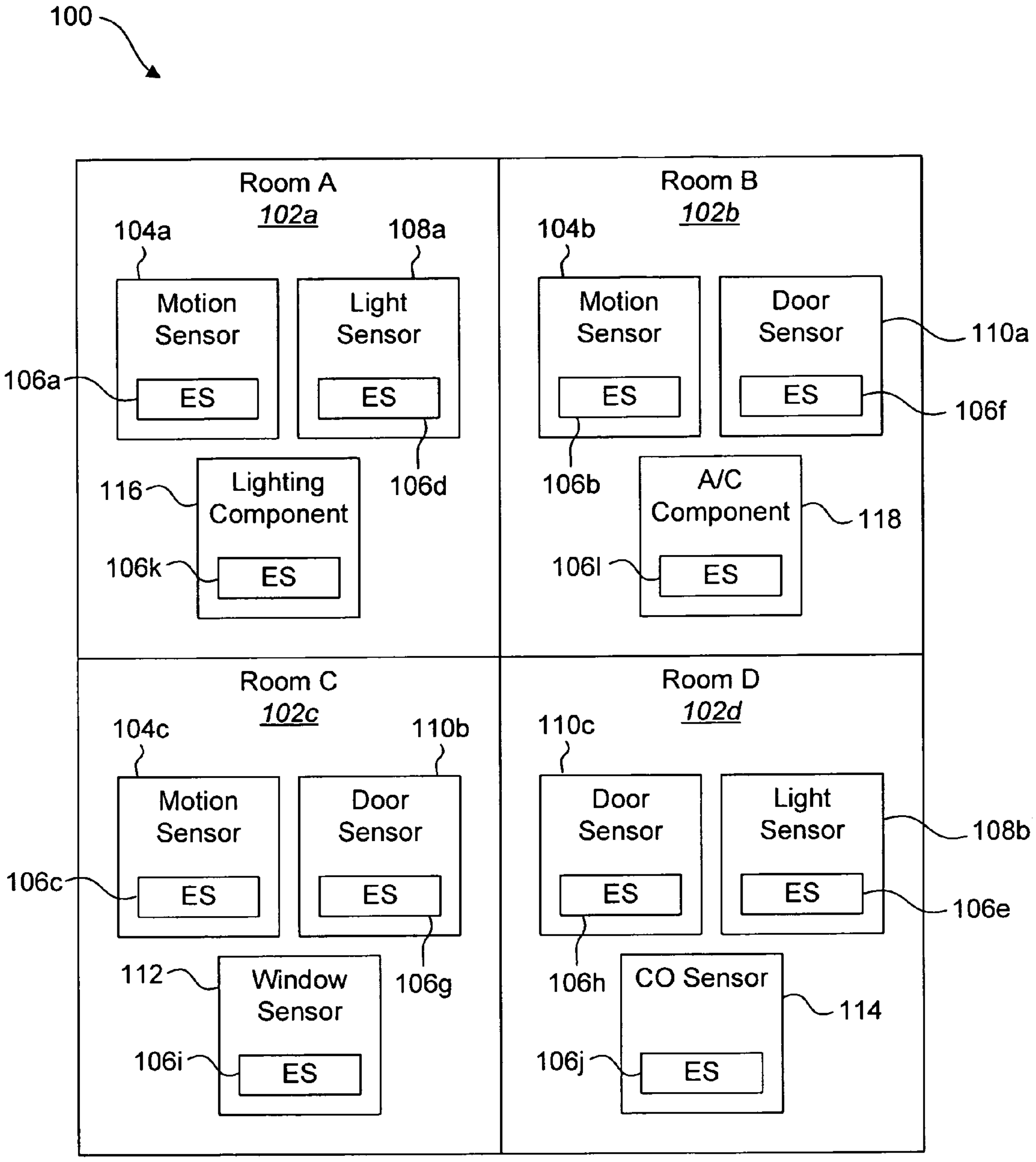
FIG. 1 illustrates an exemplary building in which embodiments may be practiced.

Systems and methods for providing victim location information during an emergency situation are disclosed. In an exemplary embodiment, a monitoring system receives data from embedded systems that are located within a building. The embedded systems may be contained within components (e.g., sensors, switches, etc.) that are situated within the building. Rules are defined for interpreting the data. The monitoring system interprets the data based on the defined rules to obtain location information and/or event information. The location information includes possible locations of victims within the building. The event information includes events that have been detected by components within the building. The monitoring system may store the location information and the event information in a database. The location information and the event information may be provided to one or more emergency response systems.

In some embodiments, one or more emergency response systems may send request(s) for location information and/or event information to the monitoring system. The monitoring system may respond to a request that it receives by providing the requested location information and/or event information to the requesting emergency response system.

At least some of the defined rules may include a triggering event and one or more actions that are performed in response to the triggering event. Some of the defined rules may also include at least one condition. If a rule includes one or more conditions, then the rule may be structured so that the specified action(s) is/are performed only if the condition(s) is/are satisfied.

In some embodiments, the data may be received directly from the embedded systems. Alternatively, the data may be received from the embedded systems via a controller system that serves as an interface between the embedded systems and the monitoring system.

In some embodiments, the monitoring system may be located within the building where the embedded systems are located. Alternatively, the monitoring system may be located outside of the building where the embedded systems are located.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 illustrates an exemplary building 100 in which embodiments may be practiced. The building 100 may be a home, apartment complex, office building, store, etc. The building 100 includes four rooms 102, namely room A 102*a*, room B 102*b*, room C 102*c*, and room D 102*d*. Of course, the number of rooms 102 in the building 100 shown in FIG. 1 is exemplary only; embodiments disclosed herein may be practiced in buildings that have more than four rooms 102 or that have fewer than four rooms 102.

The building 100 includes a number of sensors that include embedded systems. For example, the building 100 includes several motion sensors 104 that include embedded systems 106. In particular, room A 102*a* of the building 100 includes a motion sensor 104*a* that includes an embedded system 106*a*, room B 102*b* of the building 100 includes a motion sensor 104*b* that includes an embedded system 106*b*, and room C 102*c* of the building 100 includes a motion sensor 104*c* that includes an embedded system 106*c*. The motion sensors 104 may be configured to detect motion (e.g., a person moving inside of a room 102), and to produce one or more electrical signals in response. The embedded systems 106 within the motion sensors 104 (and within other components shown in the building 100) may be configured to communicate with a monitoring system, as will be explained below.

The building 100 also includes several light sensors 108 with embedded systems 106. In particular, room A 102*a* of the building 100 includes a light sensor 108*a* with an embedded system 106*d*, and room D 102*d* of the building 100 includes a light sensor 108*b* with an embedded system 106*e*. The light sensors 108 may be configured to detect levels of light within a room 102. Alternatively, or in addition, sensors may be provided that detect a light switch being turned on or turned off.

The building 100 also includes several door sensors 110 that include embedded systems 106. In particular, room B 102*b* of the building 100 includes a door sensor 110*a* that includes an embedded system 106*f*, room C 102*c* of the building 100 includes a door sensor 110*b* that includes an embedded system 106*g*, and room D 102*d* of the building 100 includes a door sensor 110*c* that includes an embedded system 106*h*. The door sensors 110 may be configured to detect movement of a door (e.g., when a door opens and/or closes), and to produce one or more electrical signals in response.

Room C 102*c* of the building 100 includes a window sensor 112 that includes an embedded system 106*i*. The window sensor 112 may be configured to detect movement of a window (e.g., when a window opens and/or closes), and to produce one or more electrical signals in response. Room D 102*d* includes a carbon monoxide (CO) sensor 114 that includes an embedded system 106*j*. The carbon monoxide sensor 114 may be configured to determine whether the amount of carbon monoxide in room D 102*d* exceeds a predetermined level.

The building 100 includes a number of devices other than sensors that include embedded systems 106. For example, room A 102*a* includes a lighting component 116 that includes an embedded system 106*k*. The lighting component 116 may be configured to illuminate room A 102*a* when a light switch (not shown) is turned on. Room B 102*b* includes an air conditioning component 118 with an embedded system 106*l*. The air conditioning component 118 may be configured to maintain the temperature in room B 102*b* at a certain level, which may be set by a user.

Of course, the number and types of sensors, switches, and other components shown in FIG. 1 are exemplary only. Embodiments may be practiced in buildings with different configurations of sensors, switches, and other components.

Figure 2:
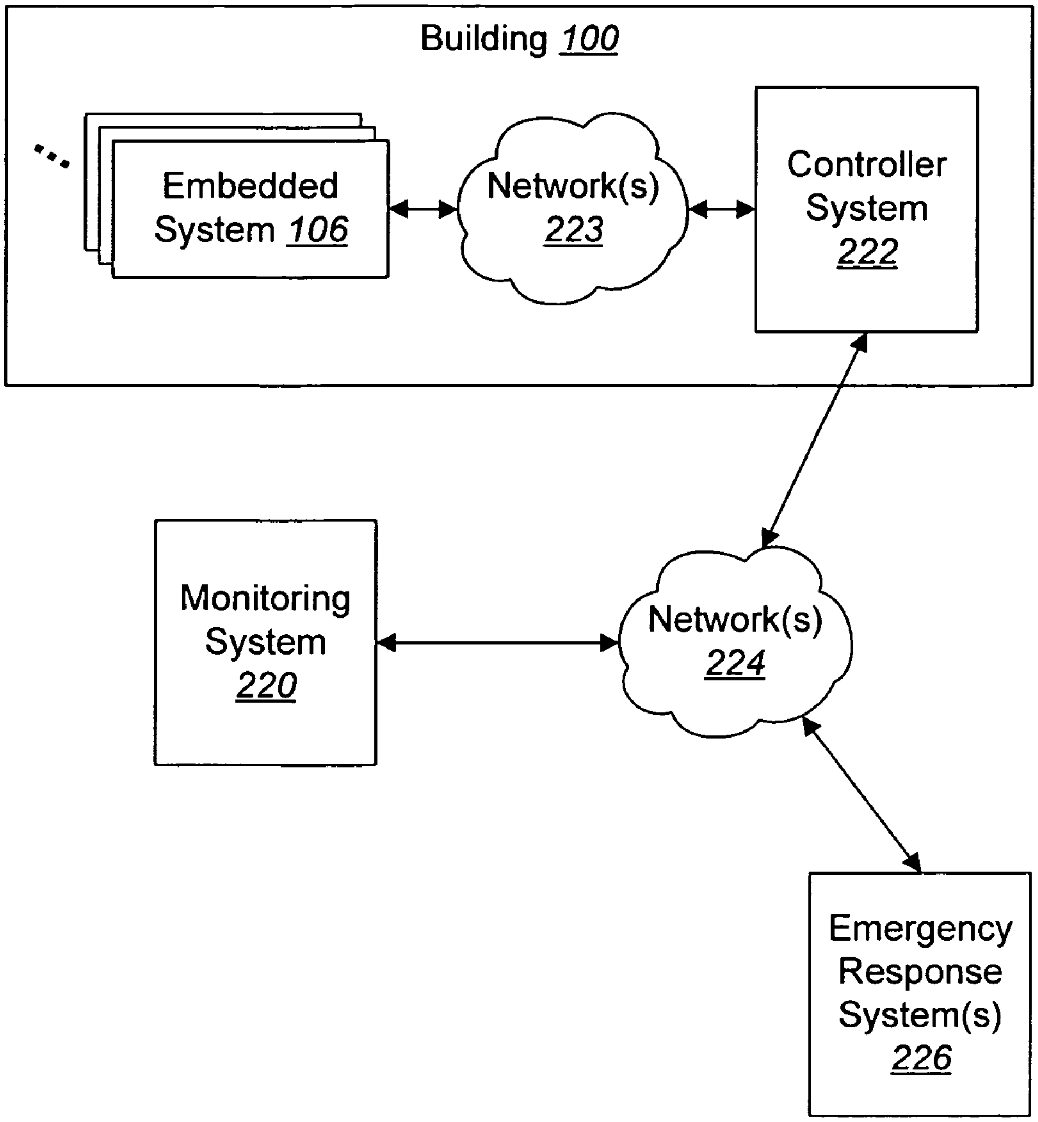
FIG. 2 illustrates an exemplary way that the embedded systems in the building may be placed in electronic communication with a monitoring system.

FIG. 2 illustrates an exemplary way that the embedded systems 106 in the building 100 may be placed in electronic communication with a monitoring system 220. In general terms, the monitoring system 220 receives data from the embedded systems 106 in the building 100 and performs calculations on this data to determine possible locations of people in the building 100. Additional details about the operation of the monitoring system 220 will be discussed in greater detail below.

In the embodiment depicted in FIG. 2, the embedded systems 106 in the building 100 are in communication with a controller system 222. The controller system 222 is located in the same building 100 as the embedded systems 106 are located. The controller system 222 serves as an interface between the embedded systems 106 in the building 100 and the monitoring system 220, which in the depicted embodiment is located outside of the building 100. Communication between the embedded systems 106 and the controller system 222 may occur via one or more networks 223. Also, communication between the controller system 222 and the monitoring system 220 may occur via one or more networks 224. For example, communication between the controller system 222 and the monitoring system 220 may occur via a pager network, a cellular network, a global communications network, the Internet, a computer network, a telephone network, and so forth, including combinations thereof.

The monitoring system 220 is also in electronic communication with one or more emergency response systems 226. The term "emergency response system" 226 refers to a computer system that is used by an organization that provides assistance in the event of an emergency (e.g., police station, fire department, etc.). Both the monitoring system 220 and the emergency response system(s) 226 may be any device or combination of devices that is capable of processing information to produce a desired result. For example, the monitoring system 220 and/or the emergency response system(s) 226 may be a personal computer, a hand-held computer, a personal digital assistant (PDAs), a server, a mainframe, a supercomputer, a minicomputer, a workstation, a microcomputer, a microcontroller, and the like. Communication between the monitoring system 220 and the emergency response system(s) 226 may also occur via one or more network(s) 224.

In the depicted embodiment, the network(s) 224 that facilitate communication between the controller system 222 and the monitoring system 220 also facilitate communication between the monitoring system 220 and the emergency response system(s) 226. In alternative embodiments, one set of network(s) may facilitate communication between the controller system 222 and the monitoring system 220, and a different set of network(s) may facilitate communication between the monitoring system 220 and the emergency response system(s) 226. Additionally, the emergency response system(s) 226 are not required to always be in communication with the network(s) 224.

Figure 3:
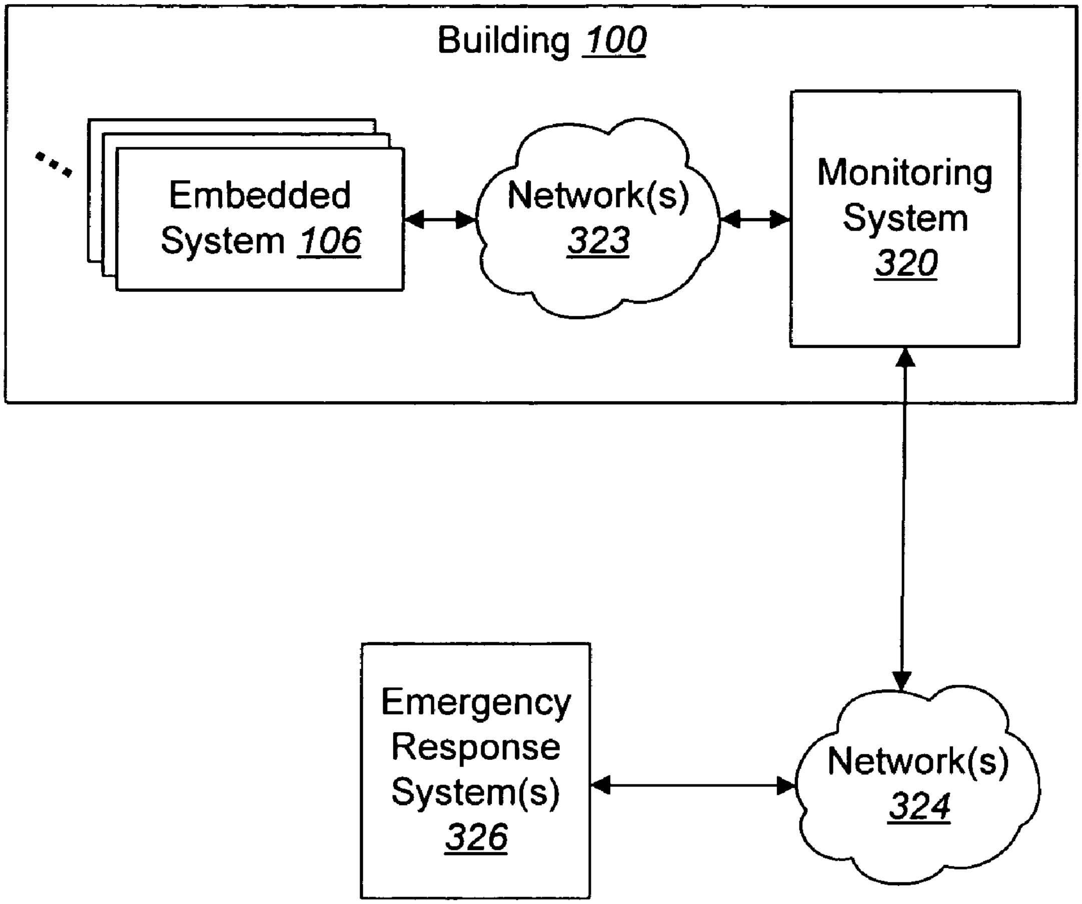
FIG. 3 illustrates another exemplary way that the embedded systems in the building may be placed in electronic communication with a monitoring system.

FIG. 3 illustrates another exemplary way that the embedded systems 106 in the building 100 may be placed in electronic communication with a monitoring system 320. In the depicted embodiment, the monitoring system 320 is located in the same building 100 as the embedded systems 106. The embedded systems 106 in the building 100 communicate directly with the monitoring system 320. Communication between the embedded systems 106 and the monitoring system 320 may occur via one or more networks 323. Also, the monitoring system 320 is in communication with one or more emergency response systems 326 via one or more network(s) 324.

As shown in FIGS. 2-3, a monitoring system 220, 320 may be configured to gather information about the location of people within a single building 100. Alternatively, although this is not explicitly shown in FIGS. 2-3, a monitoring system 220, 320 may be configured to gather information about the location of people within multiple buildings 100.

Figure 4:
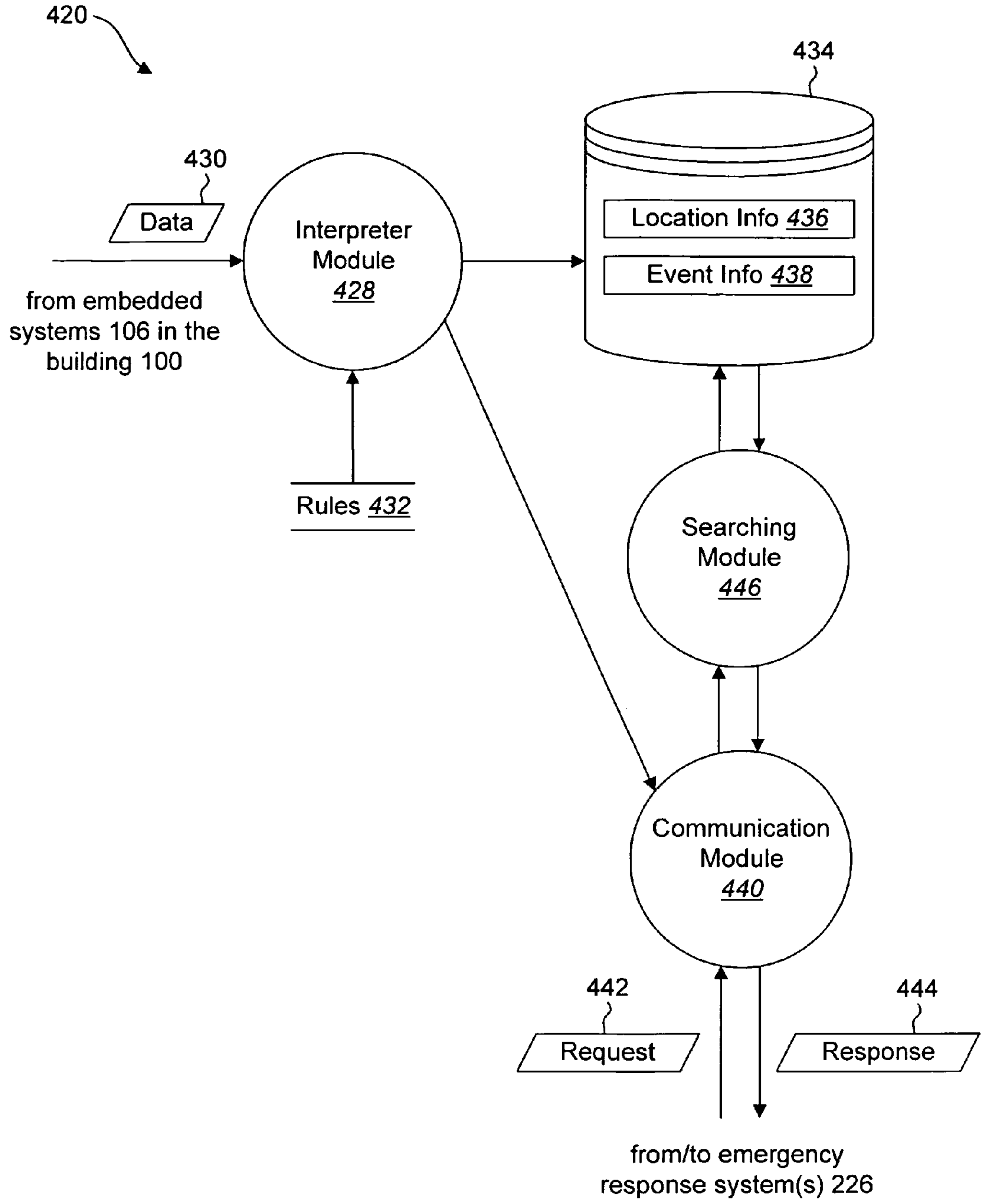
FIG. 4 illustrates various software components that may be used by a monitoring system according to an embodiment.

FIG. 4 illustrates various software components that may be used by a monitoring system 420 according to an embodiment. In the depicted embodiment, the monitoring system 420 includes an interpreter module 428. The interpreter module 428 receives data 430 from the embedded systems 106 in the sensors, switches, and other components in the building 100. In some embodiments, the interpreter module 428 may receive this data 430 via the controller system 222, as shown above in FIG. 2. Alternatively, the interpreter module 428 may receive this data 430 directly from the embedded systems 106 in the building 100. The interpreter module 428 may be configured to interpret the data 430 that it receives in order to determine the location of people within the building 100. This information may be useful in a variety of contexts, such as to determine the location of victims within the building 100 during an emergency situation.

Various rules 432 may be defined for the monitoring system 420. The rules 432 may define how the interpreter module 428 within the monitoring system 420 interprets the data 430 that it receives from the embedded systems 106 in the building 100. For example, a rule 432 may be defined which indicates that if a motion sensor 104 that is located within a room 102 detects motion within the room 102, then it is likely that a person is located within that room 102. Some other specific examples of rules 432 that may be defined for the monitoring system 420 will be discussed below.

In the depicted embodiment, a database 434 is provided to store information about the building 100. The database 434 may store location information 436, i.e., information about the possible location of people within the building 100. The database 434 may also include event information 438, i.e., information about the events that have been detected by the sensors, switches, and other components in the building 100. When the interpreter module 428 receives data 430 from the embedded systems 106 in the building 100, it may update the location information 436 and/or at the event information 438 in the database 434 in accordance with the rules 432 that are defined. As shown in FIG. 4, the building information database 434 may be part of the monitoring system 420. Alternatively, the building information database 434 may be part of a separate system that is in electronic communication with the monitoring system 420.

The monitoring system 420 also includes a communication module 440. The communication module 440 may serve as an interface to one or more emergency response systems 226. The communication module 440 may receive requests 442 for information from emergency response systems 226. An emergency response system 226 may send a request 442 for information when an emergency occurs involving the building 100 (e.g., when there is a fire in the building 100, when the building 100 collapses, etc.). In response to receiving such a request 442, the communication module 440 may make a call to a searching module 446, which searches the database 434 for the requested information and returns the requested information to the communication module 440. The communication module 440 may send a response 444 that includes the requested information back to the emergency response system 226 that sent the request 442.

Under some circumstances, the monitoring system 420 may notify one or more emergency response systems 226, via the communication module 440, in response to the occurrence of an emergency event. For example, a rule 432 may be defined that is executed when the interpreter module 428 receives data 430 that indicates the occurrence of an emergency event (e.g., a smoke detector being activated, a carbon monoxide sensor detecting a dangerous carbon monoxide level, etc.).

Figure 5:
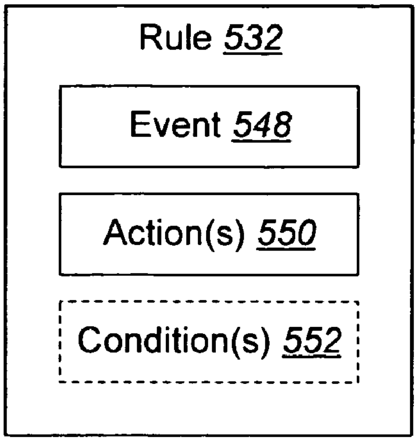
FIG. 5 illustrates an exemplary rule that may be defined for the monitoring system according to an embodiment.

FIG. 5 illustrates an exemplary rule 532 that may be defined for the monitoring system 220 according to an embodiment. The rule 532 may be applied by the interpreter module 428 upon the occurrence of a triggering event 548. The interpreter module 428 may be notified of the triggering event 548 by the data 430 that is received from the embedded systems 106 that are located in the building 100. The rule 532 includes one or more actions 550. The monitoring system 220 may be configured so that upon the occurrence of the triggering event 548 the specified action(s) 550 is/are performed.

Some specific examples of rules 532 that may be defined will now be discussed. A rule 532 may be defined where the triggering event 548 is a motion sensor 104 that is located in a particular room 102 detecting motion within the room 102. For such a rule 532, the corresponding action 550 may be that the interpreter module 428 updates the location information 436 in the database 434 to indicate that a person is likely in the room 102.

As another example, a rule 532 may be defined where the triggering event 548 is a carbon monoxide sensor 114 within a room 102 detecting a dangerous level of carbon monoxide in the room 102. In this example, the corresponding action 550 may be that the interpreter module 428 instructs the communication module 440 to notify at least one emergency response system(s) 226 about this dangerous condition which has been detected. Additionally, this type of event could modify the behavior of the system. This may be useful because many emergencies, like a fire, may impact the ability of the system to provide accurate information. For example, at the first indication of a fire a rule 532 may be defined where the triggering event 548 is a command to the database 434 to begin periodic backups. The searching module 446 may make use of these backups if it determines that the results of the interpreter module 428 were affected by the catastrophe (for example, sensors being destroyed in a fire).

As shown in FIG. 5, a rule 532 may also include one or more conditions 552. If a rule 532 includes at least one condition 552, then the interpreter module 428 may be configured to determine whether the condition(s) 552 is/are satisfied, and to only execute the specified action(s) 550 if the condition(s) 552 is/are satisfied.

For example, a rule 532 may be defined where the triggering event 548 is a door sensor 110 detecting the opening and/or the closing of a door within a particular room 102. In this example, one of the defined conditions 552 may be to determine whether a motion sensor 104 within the room (if present) has detected motion after the opening and/or closing of the door. If a motion sensor 104 detects motion within the room 102 after the opening/closing of the door, the corresponding action 550 may be to update the location information 436 to indicate that a person is likely in the room 102. The opposite rule 532 may also exist, where if no activity is sensed (motion, lights, etc.) after the opening and/or closing of the door, the corresponding action 550 may be to update the location information 436 to indicate that a person is not likely in the room 102.

As another example, a rule 532 may be defined where the triggering event 548 is that a lighting component 116 is turned off. In this example, the condition 552 may be to determine whether the event occurred within one or more defined periods of time. If the triggering event 548 occurs within a defined period of time where lighting would likely be used if the room were occupied (e.g., during the early evening hours, such as between the hours of 7:00 PM and 11:00 PM), then the action 550 may be to update the location information 436 to indicate that a person is likely not in the room 102. If the absence of lighting in the room 102 is inconclusive during the period of time when the lighting component 116 is turned off (e.g., during nighttime hours in a bedroom when people may be sleeping), then the rule 532 may be structured so that no action 550 is taken. However, if a lighting component 116 is turned off in a room other than a bedroom during nighttime hours (e.g., bathroom, kitchen, etc.), it is still reasonable to assume that the person has left the room 102. Accordingly, if these conditions 552 are satisfied the action 550 may be to indicate that there is no longer a person in the room 102.

Figure 6:
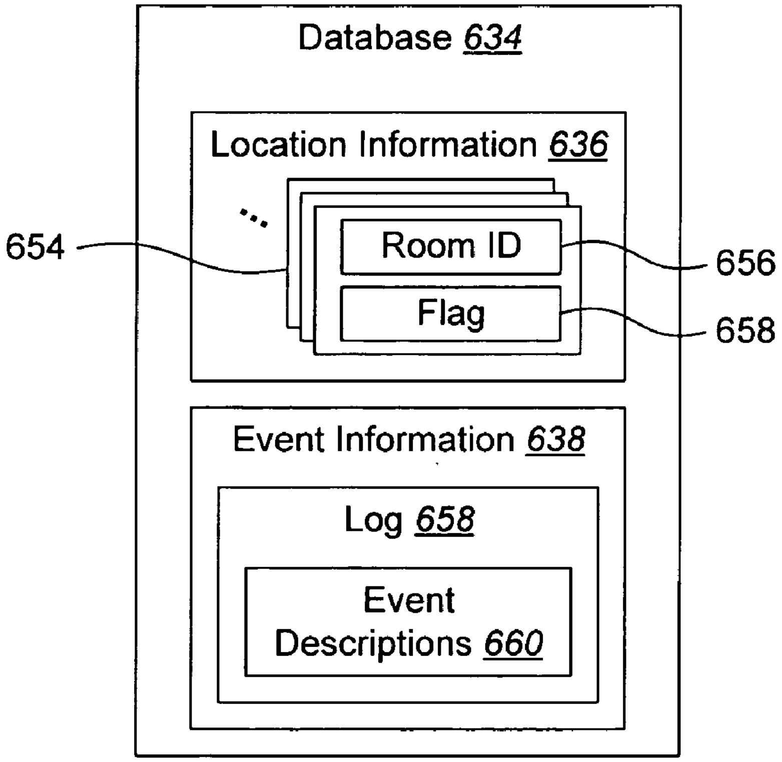
FIG. 6 illustrates an exemplary building information database according to an embodiment.

FIG. 6 illustrates an exemplary building information database 634 according to an embodiment. As indicated above, the database 634 includes location information 636, i.e., information about the location of people within the building 100. In the depicted embodiment, the location information 636 may take the form of a separate record 654 for each room 102 within the building 100. Each record 654 includes a room identifier field 656 and a location flag field 658. The room identifier field 656 uniquely identifies a particular room 102 in the building 100. The room identifier field 656 may include a word or phrase that describes the room 102 (e.g., "kitchen," "bedroom," "bathroom," etc.). The room identifier field 656 may also include information about the location of the room 102 within the building 100 (e.g., "2nd floor, southwest corner"). The location flag field 658 indicates whether the interpreter module 428 has determined that it is likely that a person is present in the room 102. In some embodiments, the location flag field 658 may have two possible values: a first value if the interpreter module 428 has determined that a person is likely present in the room 102, and a second value if the interpreter module 428 has determined that a person is likely not present in the room 102. The interpreter module 428 may set the location flag field 658 for a particular room 102 based on the data 430 that has been received from the embedded systems 106 that are located in the room 102 and/or the rules 432 that have been defined for interpreting this data 430.

The database 634 also includes event information 638. In the depicted embodiment, the event information 638 may take the form of a log 658. The log 658 may include descriptions 660 of events that have occurred within the building 100. In some embodiments, the interpreter module 428 may add the event descriptions 660 to the log 658 based on the data 430 that it receives from the embedded systems 106 that are located in the building 100 and/or the rules 432 that have been defined for interpreting this data 430.

As indicated above, the rules 432 that are defined for the monitoring system 220 may include one or more conditions 552. The event descriptions 660 may be used to determine whether condition(s) 552 that are defined for the rules 432 are satisfied. For example, if a condition is that a motion sensor 104 within a room 102 has (or has not) detected motion within a particular time period, the interpreter module 428 may determine this information by searching for an identifier associated with the motion sensor 104 in the event descriptions 660 during the time period in question.

Figure 7:
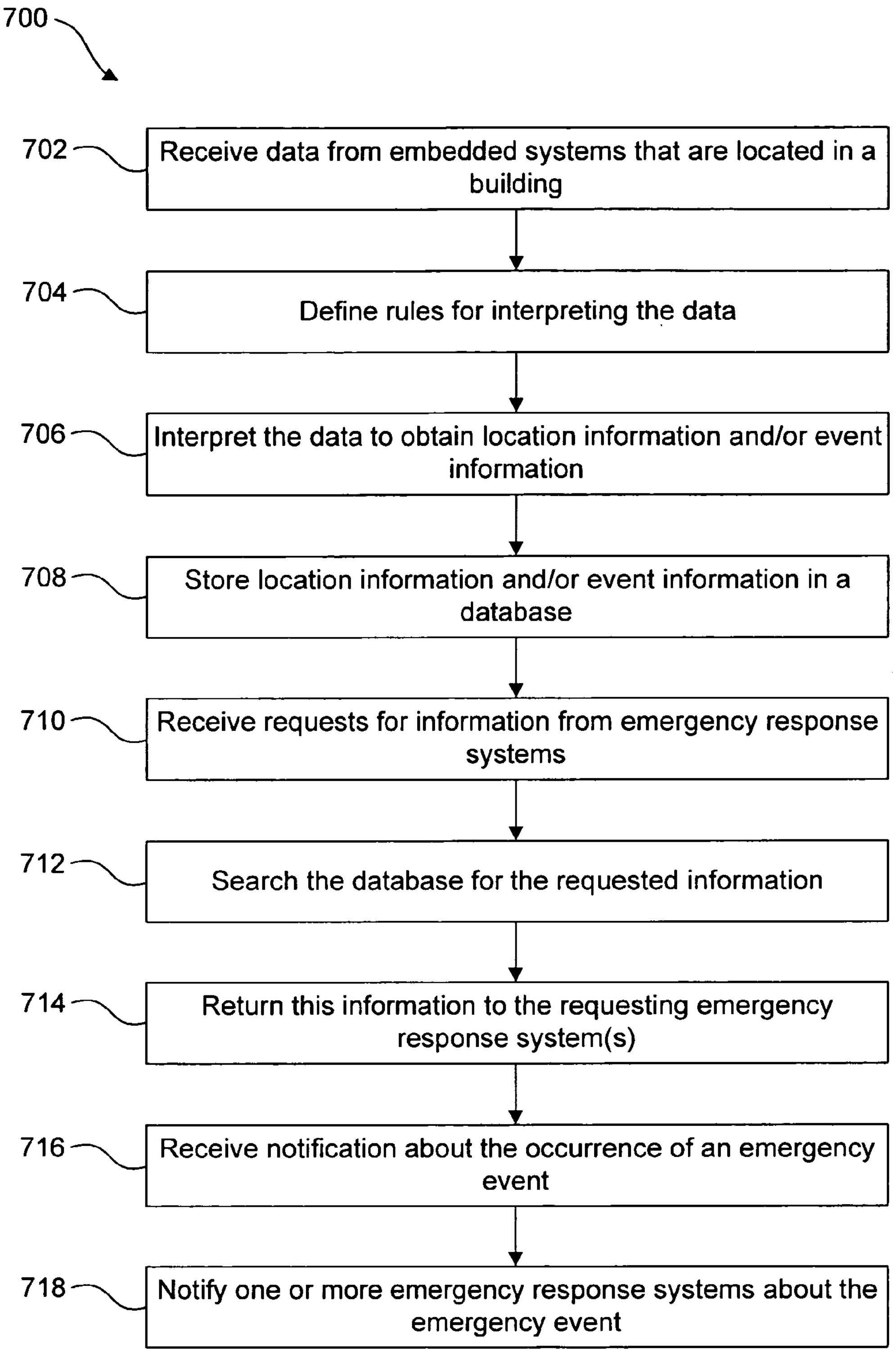
FIG. 7 is a flow diagram that illustrates the operation of the monitoring system according to an embodiment.

FIG. 7 is a flow diagram that illustrates the operation of the monitoring system 220 according to an embodiment. In accordance with the illustrated method 700, the monitoring system 220 receives 702 data 430 from the embedded systems 106 that are located in a building 100. As discussed above, these embedded systems 106 may be located within sensors, switches, and other components in the building 100. Various rules 432 are defined 704 for interpreting the data 430 that is received from the embedded systems 106. The monitoring system 220 interprets 706 the received data 430 based on the defined rules 432 to obtain location information 436 and/or event information 438. The location information 436 includes possible locations of people within the building 100. The event information 438 includes events that have been detected by the embedded systems 106 within the components (e.g., motion sensors 106, door sensors 110, lighting components 116, etc.) that are located within the building 100. The location information 436 and/or the event information 438 may be stored 708 in a database 434.

At some point, the monitoring system 220 may receive 710 one or more requests 442 for information from emergency response systems 226. An emergency response system 226 may send a request 442 for information when an emergency occurs involving the building 100. In response to receiving 710 such a request 442, the monitoring system 220 may search 712 the database 434 for the requested information and return 714 this information to the requesting emergency response system 226.

In alternative embodiments, the monitoring system 220 may be configured to provide location information 436 and/or event information 438 to one or more emergency response systems 226 without being requested to do so. For example, the monitoring system 220 may periodically send location information 436 and/or event information 438 to one or more emergency response systems 226.

At some point, the monitoring system 220 may receive 716 notification about the occurrence of an emergency event. In response, the monitoring system 220 may notify 718 one or more emergency response systems 226 about the emergency event.

In the embodiments described above, certain specific components/devices (motion sensors 104, light sensors 108, door sensors 110, etc.) have been utilized to provide data 430 about the location of people within a building 100. However, embodiments disclosed herein are not limited to these specific kinds of components/devices. Some examples of other kinds of components/devices that may be used include a television, a microwave, etc. In fact, any component/device that receives a user input may be utilized to indicate whether a person is in a room 102. If a component/device is confined to a specific physical location (or specific set of locations), this may make it easier to infer information about the location of people within a room 102 when the component/device is in use. Detecting a component/device being plugged into an electrical outlet may also indicate that a person is present in a room 102.

Figure 8:
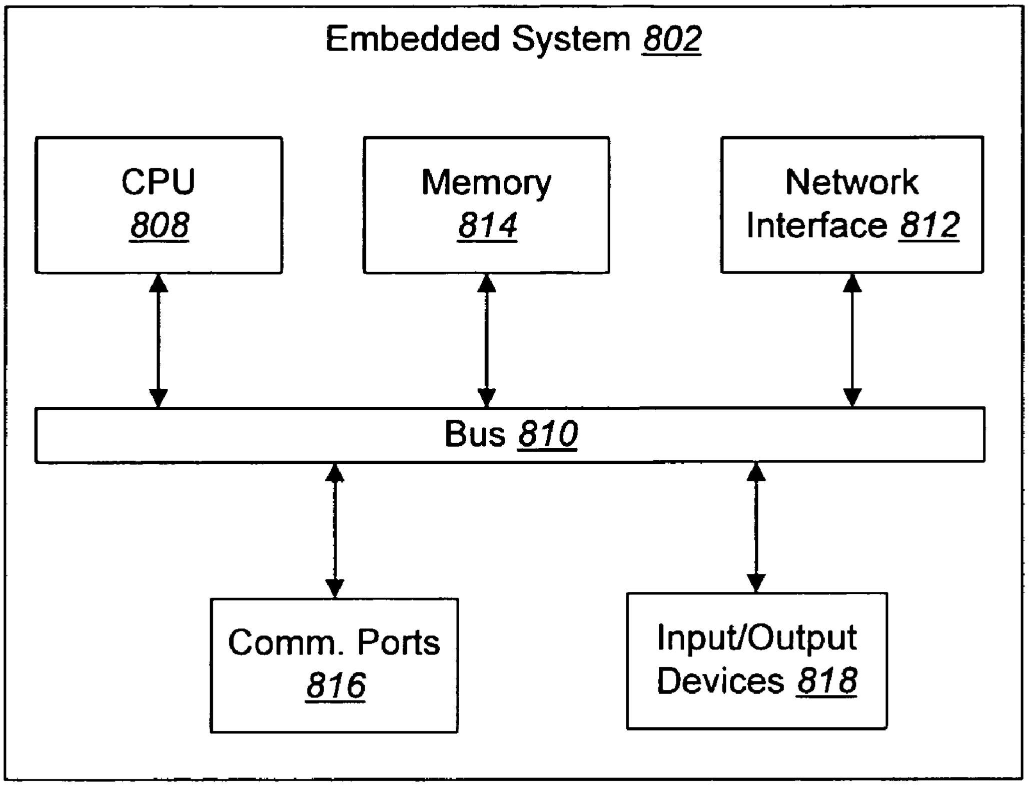
FIG. 8 is a block diagram of hardware components that may be used in an embedded system that is configured according to an embodiment.

FIG. 8 is a block diagram of hardware components that may be used in an embedded system 802 that is configured according to an embodiment. A central processing unit (CPU) 808 or processor may be provided to control the operation of the embedded system 802, including the other components thereof, which are coupled to the CPU 808 via a bus 810. The CPU 808 may be embodied as a microprocessor, microcontroller, digital signal processor or other device known in the art. The CPU 808 performs logical and arithmetic operations based on program code stored within the memory. In certain embodiments, the memory 814 may be on-board memory included with the CPU 808. For example, microcontrollers often include a certain amount of on-board memory.

The embedded system 802 may also include a network interface 812. The network interface 812 allows the embedded system 802 to be connected to a network, which may be a pager network, a cellular network, a global communications network, the Internet, a computer network, a telephone network, etc. The network interface 812 operates according to standard protocols for the applicable network.

The embedded system 802 may also include memory 814. The memory 814 may include random access memory (RAM) for storing temporary data. Alternatively, or in addition, the memory 814 may include read-only memory (ROM) for storing more permanent data, such as fixed code and configuration data. The memory 814 may also be embodied as a magnetic storage device, such as a hard disk drive. The memory 814 may be any type of electronic device that is capable of storing electronic information.

The embedded system 802 may also include one or more communication ports 816, which facilitate communication with other devices. The embedded system 802 may also include input/output devices 818, such as a keyboard, a mouse, a joystick, a touchscreen, a monitor, speakers, a printer, etc.

Of course, FIG. 8 illustrates only one possible configuration of an embedded system 802. Various other architectures and components may be utilized.

Figure 9:
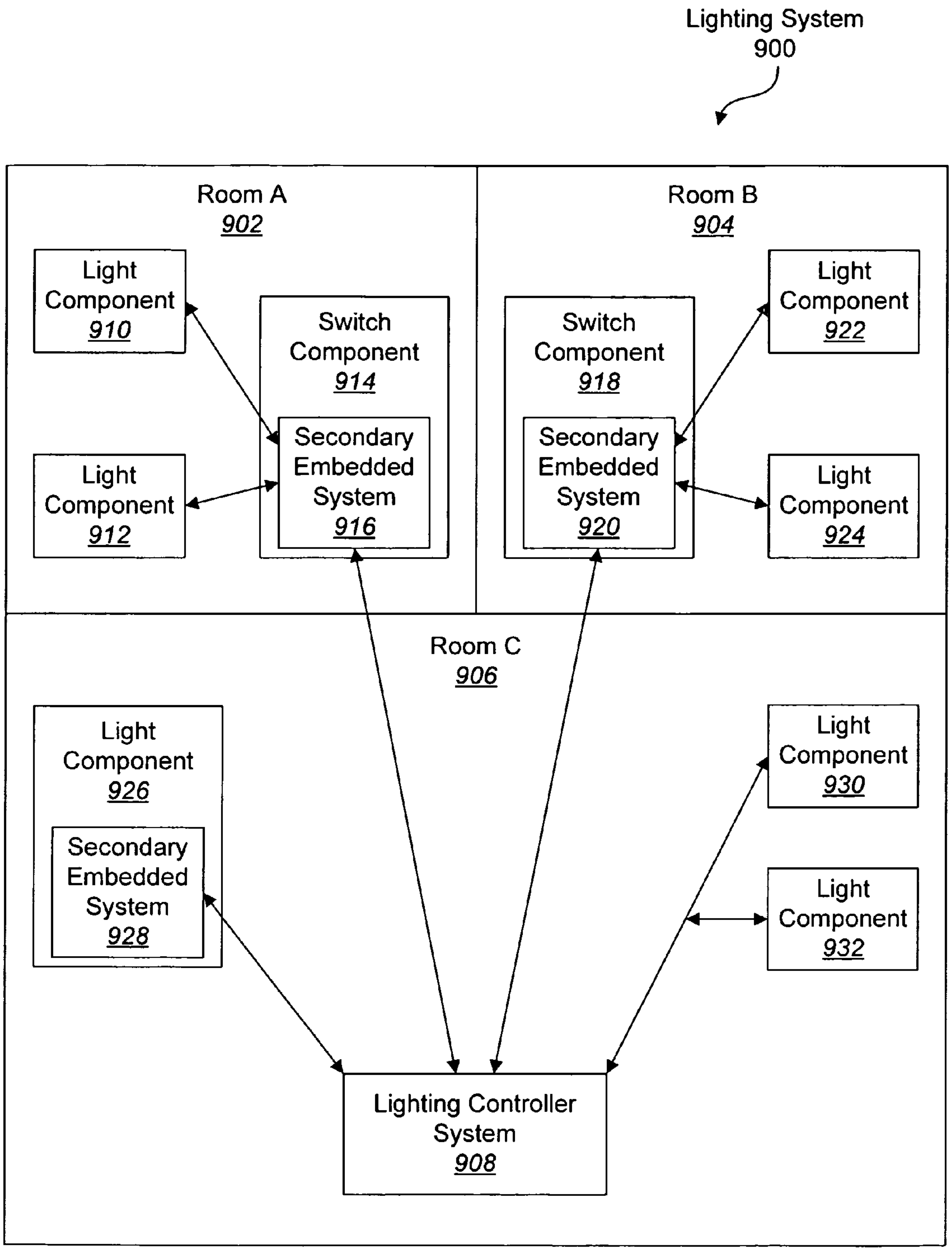
FIG. 9 illustrates an exemplary lighting system in which the present systems and methods may be implemented.

The present systems and methods may be used in several contexts. FIG. 9 illustrates one embodiment of a system wherein the present systems and methods may be implemented. FIG. 9 is a block diagram that illustrates one embodiment of a lighting system 900 that includes a lighting controller system 908. The lighting system 900 of FIG. 9 may be incorporated in various rooms in a home. As illustrated, the system 900 includes a room A 902, a room B 904, and a room C 906. Although three rooms are shown in FIG. 9, the system 900 may be implemented in any number and variety of rooms within a home, dwelling, or other environment.

The lighting controller system 908 may monitor and control additional embedded systems and components within the system 900. In one embodiment, the room A 902 and the room B 904 each include a switch component 914, 918. The switch components 914, 918 may also include a secondary embedded system 916, 920. The secondary embedded systems 916, 920 may receive instructions from the lighting controller system 908. The secondary embedded systems 916, 920 may then execute these instructions. The instructions may include powering on or powering off various light components 910, 912, 922, and 924. The instructions may also include dimming the brightness or increasing the brightness of the various light components 910, 912, 922, and 924. The instructions may further include arranging the brightness of the light components 910, 912, 922, and 924 in various patterns. The secondary embedded systems 916, 920 facilitate the lighting controller system 908 to monitor and control each light component 910, 912, 922, and 924 located in the room A 902 and the room B 904.

The lighting controller system 908 might also provide instructions directly to a light component 926 that includes a secondary embedded system 928 in the depicted room C 906. The lighting controller system 908 may instruct the secondary embedded system 928 to power down or power up the individual light component 926. Similarly, the instructions received from the lighting controller system 908 may include dimming the brightness or increasing the brightness of the individual light component 926.

The lighting controller system 908 may also monitor and provide instructions directly to individual light components 930 and 932 within the system 900. These instructions may include similar instructions as described previously.

Figure 10:
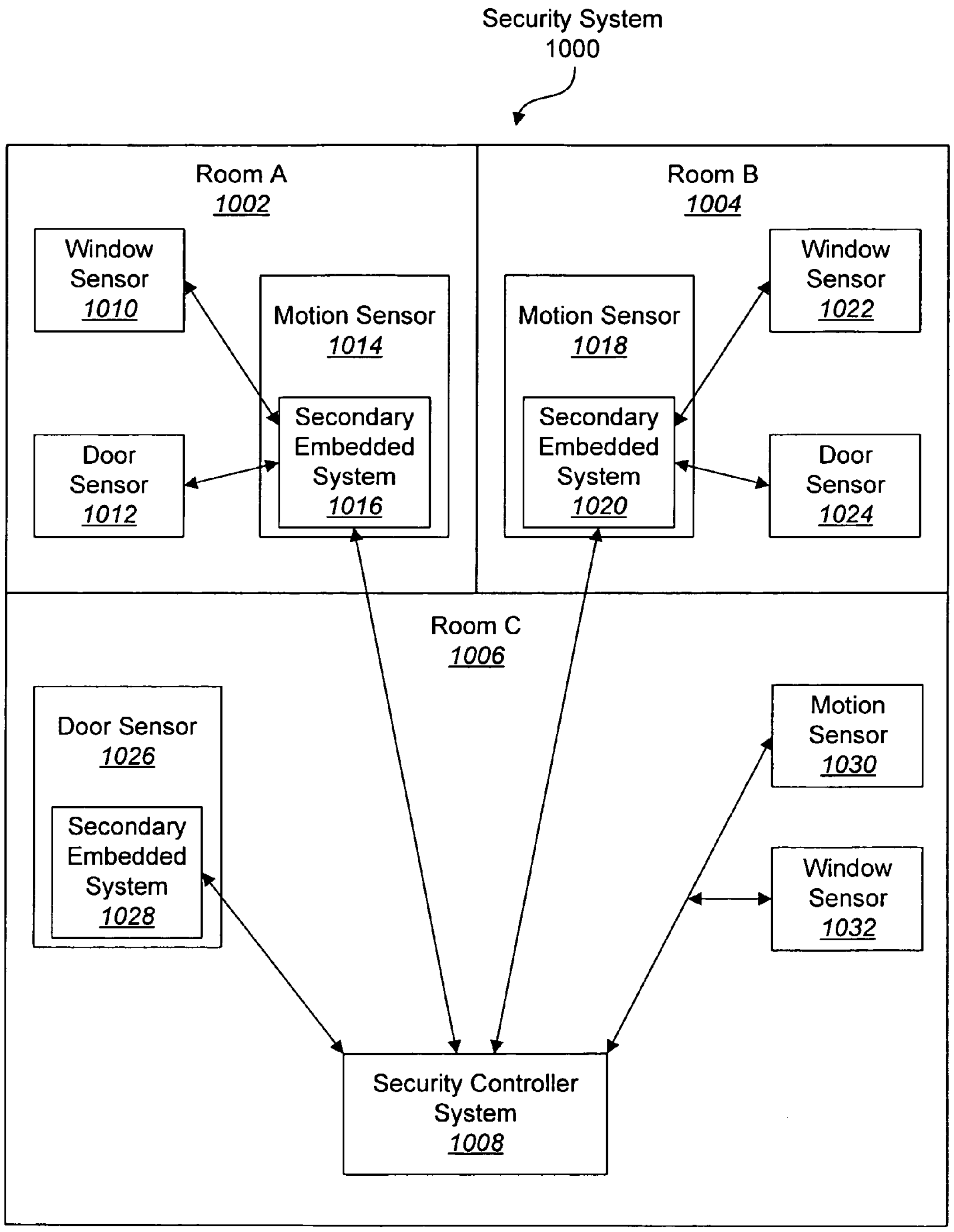
FIG. 10 illustrates an exemplary security system in which the present systems and methods may be implemented.

FIG. 10 is an additional embodiment of a system wherein the present systems and methods of the present invention may be implemented. FIG. 10 is a block diagram illustrating a security system 1000. The security system 1000 in the depicted embodiment is implemented in a room A 1002, a room B 1004, and a room C 1006. These rooms may be in the confines of a home or other enclosed environment. The system 1000 may also be implemented in an open environment where the rooms A, B and C, 1002, 1004, and 1006 respectively represent territories or boundaries.

The system 1000 includes a security controller system 1008. The security controller system 1008 monitors and receives information from the various components within the system 1000. For example, a motion sensor 1014, 1018 may include a secondary embedded system 1016, 1020. The motion sensors 1014, 1018 may monitor an immediate space for motion and alert the security controller system 1008 when motion is detected via the secondary embedded system 1016, 1020. The security controller system 1008 may also provide instructions to the various components within the system 1000. For example, the security controller system 1008 may provide instructions to the secondary embedded systems 1016, 1020 to power up or power down a window sensor 1010, 1022 and a door sensor 1012, 1024. In one embodiment, the secondary embedded systems 1016, 1020 notify the security controller system 1008 when the window sensors 1010, 1022 detect movement of a window. Similarly, the secondary embedded systems 1016, 1020 notify the security controller system 1008 when the door sensors 1012, 1024 detect movement of a door. The secondary embedded systems 1016, 1020 may instruct the motion sensors 1014, 1018 to activate the LED (not shown) located within the motion sensors 1014, 1018.

The security controller system 1008 may also monitor and provide instructions directly to individual components within the system 1000. For example, the security controller system 1008 may monitor and provide instructions to power up or power down to a motion sensor 1030 or a window sensor 1032. The security controller system 1008 may also instruct the motion sensor 1030 and the window sensor 1032 to activate the LED (not shown) or audio alert notifications within the sensors 1030 and 1032.

Each individual component comprising the system 1000 may also include a secondary embedded system. For example, FIG. 10 illustrates a door sensor 1026 including a secondary embedded system 1028. The security controller system 1008 may monitor and provide instructions to the secondary embedded system 1028 in a similar manner as previously described.

Figure 11:
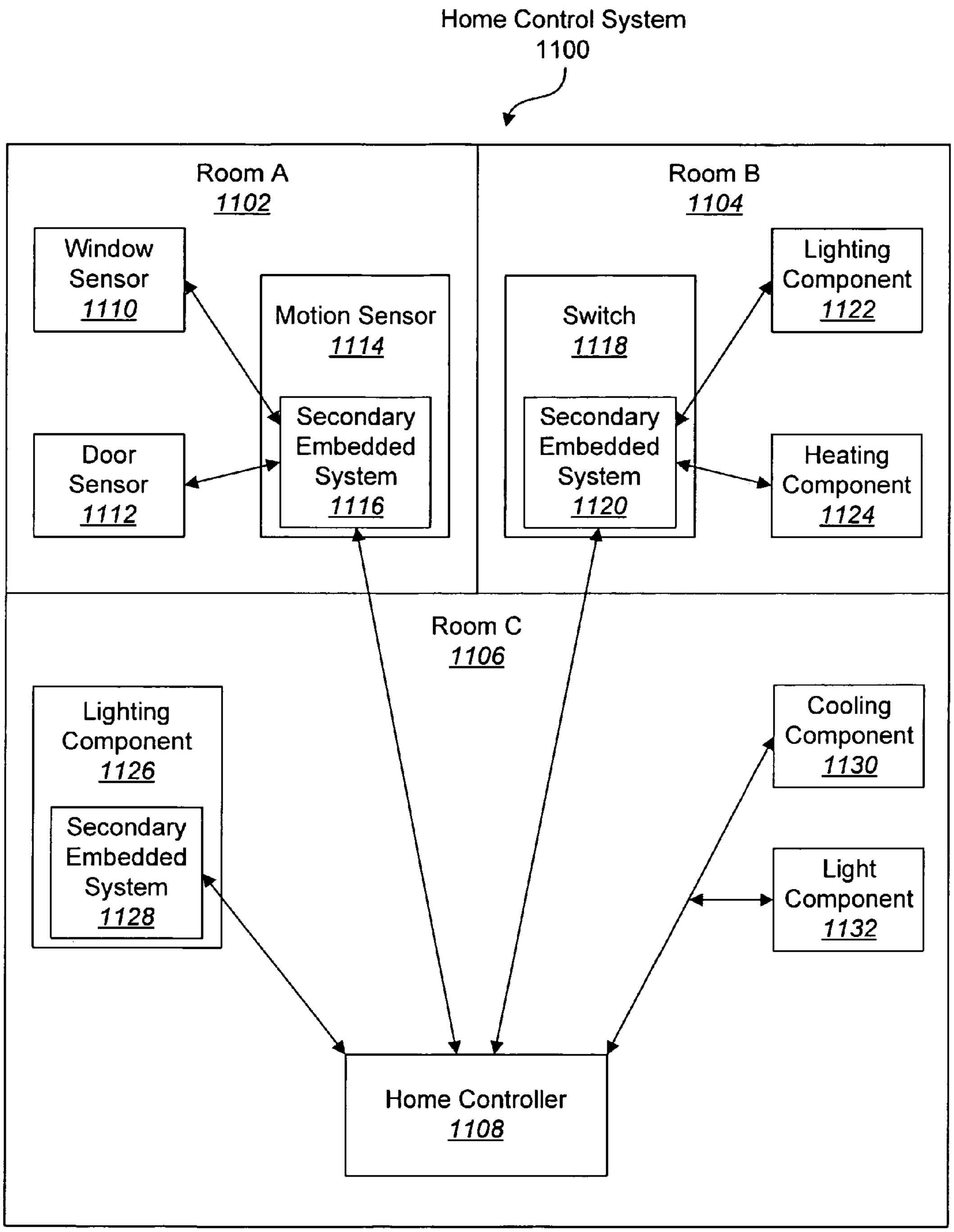
FIG. 11 illustrates an exemplary home controller system in which the present systems and methods may be implemented.

FIG. 11 is a block diagram illustrating one embodiment of a home control system 1100. The home control system 1100 includes a home controller 1108 that facilitates the monitoring of various systems such as the lighting system 900, the security system 1000, and the like. The home control system 1100 allows a user to control various components and systems through one or more embedded systems. In one embodiment, the home controller system 1108 monitors and provides information in the same manner as previously described in relation to FIGS. 9 and 10. In the depicted embodiment, the home controller 1108 provides instructions to a heating component 1124 via a secondary embedded system 1120. The heating component 1124 may include a furnace or other heating device typically found in resident locations or offices. The home controller system 1108 may provide instructions to power up or power down the heating component 1124 via the secondary embedded system 1120.

Similarly, the home controller 1108 may monitor and provide instructions directly to a component within the home control system 1100 such as a cooling component 1130. The cooling component 1130 may include an air conditioner or other cooling device typically found in resident locations or offices. The central home controller 1108 may instruct the cooling component 1130 to power up or power down depending on the temperature reading collected by the central embedded system 1108. The home control system 1100 functions in a similar manner as previously described in relation to FIGS. 9 and 10.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for providing information about the possible location of victims within a building during an emergency situation, the method being implemented by a monitoring system, the method comprising:

receiving data from embedded systems that are located within a building,
  wherein the data comprises data from a controller system for the building indicating whether a particular device has been turned on or off;

defining rules for interpreting the data, wherein each rule comprises:
  a triggering event, wherein the triggering event includes an action by a building occupant, wherein the action by the building occupant comprises:
    opening or closing a door, or turning on or turning off a device, or plugging in or unplugging a device, or turning a light on or turning a light off, or the occupant moving within the building; and
  one or more actions that are performed in response to the triggering event;

interpreting the data based on the defined rules to obtain location information that comprises possible locations of victims within the building, wherein the possible locations of victims are based upon the actions by the building occupant;

storing the location information in a database automatically based on the actions of the building occupant, wherein the location information for a particular room comprises either a first value or a second value, wherein the first value indicates that the room is likely occupied and the second value indicates that the room is likely not occupied;

providing the location information to one or more emergency response systems;

receiving notification about the occurrence of an emergency event;

in response to the notification, notifying the one or more emergency response systems about the emergency event; and modifying behavior of the monitoring system based on the occurrence of the emergency event.

2. The method of claim 1, further comprising receiving at least one request for the location information from the one or more emergency response systems, and wherein the location information is provided to the one or more emergency response systems in response to the at least one request.

3. The method of claim 1, further comprising interpreting the data based on the defined rules to obtain event information that comprises events that have been detected by components within the building.

4. The method of claim 3, further comprising storing the event information in a database.

5. The method of claim 1, wherein at least some of the rules comprise:

at least one condition; and one or more actions that are performed if the triggering event occurs and the at least one condition is satisfied.

6. The method of claim 1, wherein the data is received from the embedded systems via a controller system that serves as an interface between the embedded systems and the monitoring system.

7. The method of claim 1, wherein the monitoring system is located within the building.

8. The method of claim 1, wherein the monitoring system is located outside of the building.

9. A monitoring system that is configured to provide information about the possible location of victims within a building during an emergency situation, comprising:

a processor;

memory in electronic communication with the processor;

instructions stored in the memory, the instructions being executable to:

receive data from embedded systems that are located within a building, wherein the data comprises data from a controller system for the building indicating whether a particular device has been turned on or off;

define rules for interpreting the data, wherein each rule comprises:

a triggering event, wherein the triggering event includes an action by a building occupant, wherein the action by the building occupant comprises:

opening or closing a door, or turning on or turning off a device, or plugging in or unplugging a device, or turning a light on or turning a light off, or the occupant moving within the building; and one or more actions that are performed in response to the triggering event;

interpret the data based on the defined rules to obtain location information that comprises possible locations of victims within the building, wherein the possible locations of victims are based upon the actions by the building occupant;

store the location information in a database automatically based on the actions of the building occupant, wherein the location information for a particular room comprises either a first value or a second value, wherein the first value indicates that the room is likely occupied and the second value indicates that the room is likely not occupied;

provide the location information to one or more emergency response systems;

receive notification about the occurrence of an emergency event;

in response to the notification, notify the one or more emergency response systems about the emergency event; and modify behavior of the monitoring system based on the occurrence of the emergency event.

10. The monitoring system of claim 9, wherein the instructions are further executable to receive at least one request for the location information from the one or more emergency response systems, and wherein the location information is provided to the one or more emergency response systems in response to the at least one request.

11. The monitoring system of claim 9, wherein the instructions are further executable to interpret the data based on the defined rules to obtain event information that comprises events that have been detected by components within the building.

12. A storage medium comprising executable instructions for providing information about the possible location of victims within a building during an emergency situation, the instructions being executable to:

receive data from embedded systems that are located within a building, wherein the data comprises data from a controller system for the building indicating whether a particular device has been turned on or off;

define rules for interpreting the data, wherein each rule comprises:

a triggering event, wherein the triggering event includes an action by a building occupant, wherein the action by the building occupant comprises:

opening or closing a door, or turning on or turning off a device, or plugging in or unplugging a device, or turning a light on or turning a light off, or the occupant moving within the building; and one or more actions that are performed in response to the triggering event;

interpret the data based on the defined rules to obtain location information that comprises possible locations of victims within the building, wherein the possible locations of victims are based upon the actions by the building occupant;

store the location information in a database automatically based on the actions of the building occupant, wherein the location information for a particular room comprises either a first value or a second value, wherein the first value indicates that the room is likely occupied and the second value indicates that the room is likely not occupied;

provide the location information to one or more emergency response systems;

receive notification about the occurrence of an emergency event;

in response to the notification, notify the one or more emergency response systems about the emergency event; and modify behavior of the monitoring system based on the occurrence of the emergency event.

13. The storage medium of claim 12, wherein the instructions are further executable to receive at least one request for the location information from the one or more emergency response systems, and wherein the location information is provided to the one or more emergency response systems in response to the at least one request.

14. The storage medium of claim 12, wherein the instructions are further executable to interpret the data based on the defined rules to obtain event information that comprises events that have been detected by components within the building.

15. The storage medium of claim 12, wherein the instructions are further executable to:

receive at least one request for the location information from the one or more emergency response systems, and wherein the location information is provided to the one or more emergency response systems in response to the at least one request; and interpret the data based on the defined rules to obtain event information that comprises events that have been detected by components within the building.

16. The method of claim 1, wherein the rule is defined such that the triggering event comprises a command to the database to begin periodic backups of the database.

* * * * *